United States Patent
King

[15] 3,707,661
[45] Dec. 26, 1972

[54] ELECTRICAL DRIVE MOTOR PROTECTIVE MEANS
[72] Inventor: Ray J. King, Charlotte, N.C.
[73] Assignee: CMD Electronics, Inc., Charlotte, N.C.
[22] Filed: March 22, 1971
[21] Appl. No.: 126,602

[52] U.S. Cl..................318/484, 307/293, 317/13 A, 62/158
[51] Int. Cl..............................................H02p 5/16
[58] Field of Search .....307/293; 318/484; 317/13 A; 62/158

[56] References Cited
UNITED STATES PATENTS

| | | | |
|---|---|---|---|
| 3,434,028 | 3/1969 | McCready | 318/484 |
| 3,392,352 | 7/1968 | White | 307/293 X |
| 3,417,297 | 12/1968 | Wallenowitz | 307/293 X |
| 3,584,263 | 6/1971 | Thompson | 307/293 X |
| 3,597,637 | 8/1971 | Vandemore | 307/293 X |

Primary Examiner—Benjamin Dobeck
Attorney—Parrott, Bell, Seltzer, Park & Gibson

[57] ABSTRACT

An electrical drive motor for the compressor of a vapor compression cycle refrigeration system is protected against failure otherwise possibly occurring due to excessively frequent starting by the combination therewith of a two terminal electrical network which delays energization of the electrical drive motor for a predetermined interval of time.

7 Claims, 3 Drawing Figures

PATENTED DEC 26 1972　　　　　　　　　　　　　　　3,707,661
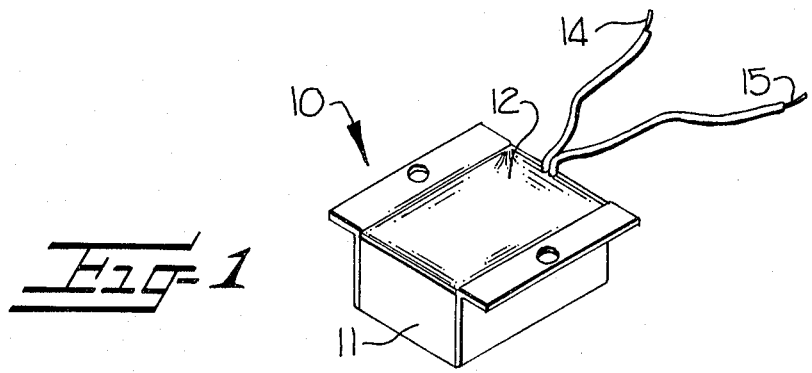
_Fig-1_
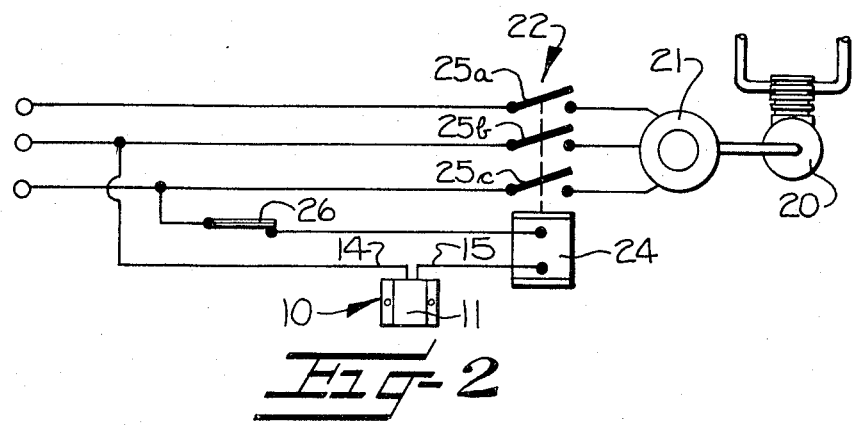
_Fig-2_
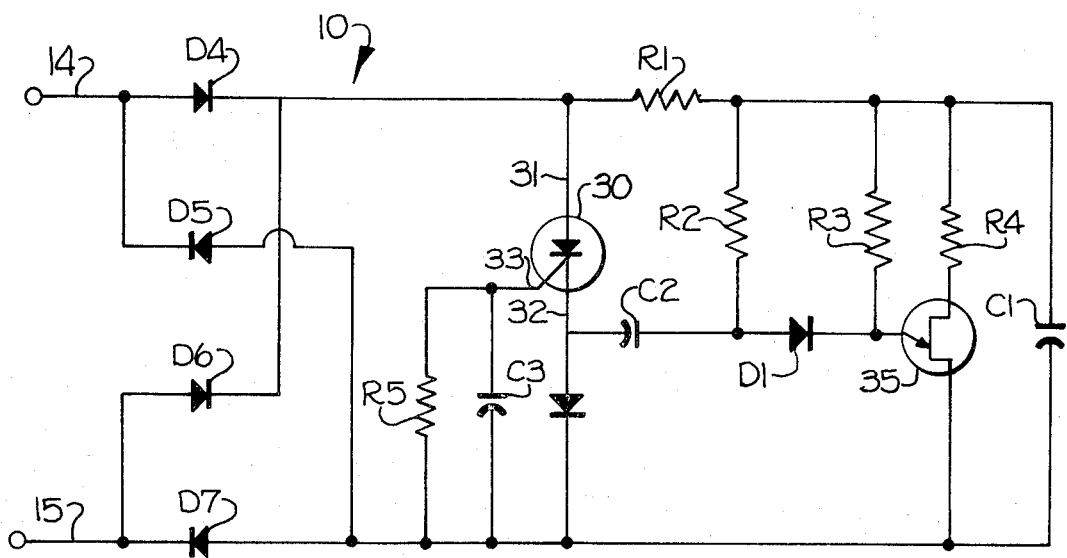
_Fig-3_

ELECTRICAL DRIVE MOTOR PROTECTIVE MEANS

It is known that vapor compression cycle refrigeration systems, and particularly comfort cooling air conditioning systems, may be subject to frequent starting and stopping for a variety of reasons. One reason for such stopping and starting is relatively rapid fluctuation in the temperature of the conditioned area being served, resulting in a temperature control such as a thermostat calling for cycling between operating and nonoperating conditions of the system. Another reason is the occurrence of pressures within the refrigeration system which cycle the system on a safety control, such as a high head pressure control.

Experience with vapor compression cycle refrigeration systems subject to such short cycling between operative and nonoperative conditions has shown that an electrical drive motor for the compressor of the refrigeration system will fail where excessively frequent starting continues for any extended period of time, due to the electrical drive motor becoming overheated, without proper opportunity for cooling thereof.

Further, it is known that an electrical drive motor may fail through imposition of the relatively high load thereon while inappropriately low voltages are available to the motor. Such a circumstance can arise where a number of air-conditioning systems are called upon to begin cooling substantially simultaneously, as may occur in the event of an interruption of electrical power service to the systems or where a plurality of window mounted air-conditioning units serve a common conditioned space.

It is an object of the present invention to protect an electrical drive motor for the compressor of a vapor compression cycle refrigeration system against failure of the type briefly reviewed above. In accordance with the present invention, the drive motor is protected by delaying energization thereof for at least a predetermined interval of time following a change in a control means which would otherwise energize the drive motor. By such a delay, excessively frequent starting such as may occur through short cycling on a thermostat or high head pressure control is precluded and failure of the drive motor is avoided. In realizing this object of the present invention, a two terminal electrical network means is electrically connected with the conventional structure of a vapor compression cycle refrigeration system, with the two terminal electrical network means initially being effectively nonconductive on application of an electrical potential across the two terminals thereof and becoming effectively conductive following expiration of a predetermined interval of time after the application of an electrical potential thereacross.

Another object of the present invention is to control conduction through a two terminal electrical network means in such a manner as to delay conduction therethrough for a predetermined interval of time. By so controlling the conduction of a two terminal electrical network means, electrical circuitry is provided which may be readily and easily accommodated to and connected with a pre-existing vapor compression cycle refrigeration system or a system being assembled.

Some of the objects and advantages of the invention having been stated, others will appear as the description proceeds, when taken in connection with the accompanying drawings, in which FIG. 1 is a isometric view of the two terminal electrical network means in accordance with the present invention;

FIG. 2 is a schematic diagram illustrating the interconnection of the two terminal electrical network means of the present invention with elements of a vapor compression cycle refrigeration system; and FIG. 3 is a schematic wiring diagram of the elements of the two terminal electrical network means of FIGS. 1 and 2.

In practice of the present subject invention, it is preferred that electrical circuitry as diagrammed in FIG. 3 be housed within a structure as illustrated in FIG. 1 and interconnected with the elements of the vapor compression cycle refrigeration system as illustrated in FIG. 2, all as more fully described hereinafter. In connection with the illustrative embodiment of the drawing, it is to be noted that specific details in the arrangement of the elements of the present invention may be varied by persons skilled in the applicable arts while still operating within the principles disclosed hereinafter and, for this reason, the following disclosure is to be construed broadly.

For ease in handling, it is preferred that the two terminal electrical network means generally indicated by the reference character 10 be housed within an appropriate casing 11, formed of sheet metal or other suitable material. Desirably, the circuit elements of the two terminal electrical network means 10 may be mounted upon an appropriate circuit board, positioned within the housing 11, and enveloped by a potting material 12 poured into the casing 11 so as to seal the circuit board therewithin while leaving the terminal conductors 14, 15 of the two terminal electrical network means 10 exposed for interconnection with other elements as disclosed hereinafter. Such potting of the two terminal electrical network means 10 precludes tampering with the elements of the circuitry thereof and substantially simplifies the task of an installer by making necessary only a connection of the terminal conductors 14, 15 into a pre-existing structure.

For purposes of the present disclosure, such a pre-existing structure may include a compressor 20 of a vapor compression cycle refrigeration system, an electrical drive motor 21 operatively connected to the compressor 20 for driving the same, and an electrical starter generally indicated at 22 for energizing the drive motor 21. As is typical of such electrical starters, the starter 22 includes an operating winding 24 which, when energized, closes associated start contacts 25a, 25b, 25c to apply electrical current to the drive motor 21.

The vapor compression cycle refrigeration system illustrated schematically in FIG. 2 includes a control means 26 electrically connected to the operating winding 24 and operative between electrically conductive and non-conductive states for electrically energizing the operating winding 24 and thereby energizing the drive motor 21. As illustrated, the control means 26 is a bimetallic, thermostatic electrical switch responsive to temperature in the conditioned area served by the refrigeration system, in a manner known to persons skilled in the installation and use of comfort cooling air-conditioning systems. However, it is acknowledged that control means arranged similarly to the control means 26 may function for purposes other than responding to conditioned area temperatures, such as by responding to pressures of refrigerant within the refrigeration system. Accordingly, the use of a thermostatic control means 26 for purposes of illustration of the present invention is not to be construed as limiting.

In order to protect the drive motor 21 against failure thereof otherwise possibly occurring due to excessively frequent starting, the two terminal electrical network means 10 of the present invention is electrically connected with the operating winding of the electrical starter 22 for delaying flow of current therethrough for a predetermined interval of time following a winding energizing change in the conductive state of the thermostatic control means 26. In particular, the two terminal electrical network means 10 is electrically connected in series with the operating winding 24. In accordance with the present invention, the two terminal electrical network 10 initially is effectively nonconductive on application of an electrical potential across the two terminals 14, 15 thereof and becomes effectively conductive following expiration of a predetermined interval of time after such application of an electrical potential.

The circuitry elements incorporated in the two terminal electrical network means 10 which permit achieving this function are schematically illustrated in FIG. 3. As therein shown, the electrical network means 10 comprises a switch device 30 operative between conductive and nonconductive states for controlling conduction through the electrical network means 10. The network means 10 further includes timing means electrically connected to the switch device 30 and to the two terminals 14, 15 of the network means 10 for sensing the presence of an electrical potential across the network terminals 14, 15, for timing a predetermined interval, and for effecting a change of the switch device 30 to a conductive state on expiration of the predetermined interval. Preferably, the switch device 30 is a thyristor and specifically a silicon controlled rectifier having an anode 31, a cathode 32 and a gate 33. The timing means comprises a resistance and capacitance network and a discharge triggering device 35. As illustrated, the timing circuit means includes the resistors R1, R2, R3, R4; the capacitors C1, C2; and a diode D1 all interconnected with the network terminals 14, 15, the thyristor 30 and the discharge triggering device 35. Preferably, the discharge triggering device 35 is an unijunction transistor.

The thyristor 30 additionally has electrically connected therewith a conduction maintaining circuit means comprising a resistor R5 and capacitor C3 electrically connected between the gate 33 and the cathode 32 for sensing conduction through the thyristor 30 of an electrical current and for continuing the thyristor 30 in a conductive state during continuance of such conduction, as disclosed more fully hereinafter.

Inasmuch as a controlled rectifier is essentially an unidirectional conductive device, insertion of the two terminal electrical network means 10 into an alternating current electrical circuit is accommodated by the presence of four rectifiers D4, D5, D6 and D7 arranged as a rectifier bridge and electrically connected with the thyristor 30. By means for the rectifier bridge, the application of an alternating current to the network terminals 14, 15 appears at the anode and cathode 31, 32 of the thyristor 30 as a fluctuating direct current.

In operation of the network means 10, the network terminals 14, 15 appear essentially conductive upon initial application of an electrical potential thereto. However, the presence of an electrical potential across the network terminals 14, 15 gives rise to the accumulation of electrical energy in the capacitor C2 at a predetermined rate. After a predetermined interval of time, established by the relative resistance and capacitance values interconnected with the discharge triggering device 35, the triggering device 35 becomes conductive and discharges the capacitor C2. Such discharge of the capacitor C2 applies a negative going pulse to the cathode 32 of the thyristor 30, causing the gate 33 to become electrically positive relative to the cathode 32. As is known to persons familiar with the operation of controlled rectifiers, such a condition effects a change in the conductive state of the thyristor 30 from a nonconductive state to a conductive state. Upon the thyristor 30 entering the conductive state, conduction between the network terminals 14, 15 begins. As will be understood, current flow through the network means 10 is thus delayed by a predetermined interval of time established by the resistance and capacitance values electrically connected with the triggering device 35.

Once conduction through the thyristor 30 is established, electrical energy is accumulated on the capacitor C3 which is connected with the gate 33 and, by selection of the values of the resistance R5 and capacitance C3 forming the conduction maintaining circuit means, the control gate 33 is maintained electrically positive relative to the cathode 32 tube through intermittent fluctuations of voltage and current, resulting from the application of an alternating current across the network terminals 14, 15. Preferably, the values used in the conduction maintaining circuit means are such that a circuit interruption of at least five cycles is required to return the two terminal electrical network means 10 to the effectively nonconductive condition.

From the interconnection of the network means 10 briefly described above with reference to FIG. 2, it will be understood that effective conduction through the operating winding 24 of the electrical starter 22 will be delayed following conduction through the thermostatic control means 26. Following expiration of the predetermined interval of time, the two terminal electrical network means 10 becomes effectively conductive, the current flow through the operating winding 20 rises to such a point that the contacts 25a, 25b, 25c thereof are closed, and the electrical drive motor 21 is energized to drive the compressor 20.

In the drawings and specification, there has been set forth a preferred embodiment of the invention, and although specific terms are employed, they are used in a generic and descriptive sense only and not for purposes of limitation.

That which is claimed is:

1. In a vapor compression cycle refrigeration system having a compressor, an electrical drive motor for the compressor, an electrical starter for energizing the drive motor and including an operating winding, and control means electrically connected to the operating winding and operative between electrically conductive and nonconductive states for electrically energizing the operating winding and thereby energizing the drive motor, the combination therewith of means for protecting the drive motor against failure otherwise possibly occurring due to excessively frequent starting and comprising a two terminal electrical network means electrically connected with the operating winding of the electrical starter for delaying flow of current therethrough for a predetermined interval of time following a winding energizing change in the conductive state of said control means, said two terminal electrical network means initially being effectively nonconductive at application of an electrical potential across the two terminals thereof and becoming effectively conductive following expiration of said predetermined interval of time after such application of an electrical potential.

2. The combination according to claim 1 wherein said two terminal electrical network means is electrically connected in series with the operating winding and further wherein said two terminal electrical network means comprises a switch device operative between conductive and nonconductive states for controlling conduction through said two terminal electrical network means and timing means electrically connected to said switch device and to said two terminals of said two terminal electrical network for sensing the presence of an electrical potential across said two terminals, for timing said predetermined interval and for effecting a change of said switch device to said conductive state on expiration of said predetermined interval.

3. The combination according to claim 2 wherein said switch device comprises a gate controlled semiconductor switch.

4. The combination according to claim 1 wherein said two terminal electrical network means comprises a thyristor operative between conductive and nonconductive states for controlling conduction through said two terminal electrical network means, timing circuit means electrically connected to the two terminals of said two terminal electrical network means for sensing the presence of an electrical potential thereacross and for timing said predetermined interval and electrically connected to said thyristor for effecting a change thereof to said conductive state on expiration of said predetermined interval, and conduction maintaining circuit means electrically connected to said thyristor for sensing conduction therethrough of an electrical current and for continuing said thyristor in said conductive state during continuance of such conduction.

5. The combination according to claim 4 wherein said thyristor is a controlled rectifier and further wherein said two terminal electrical network means comprises a rectifier bridge electrically connected with said controlled rectifier, said timing circuit means and said conduction maintaining circuit means for accommodating insertion of said two terminal electrical network means into an alternating current electrical circuit.

6. The combination according to claim 4 wherein said thyristor comprises first and second terminals and a control gate whereby said thyristor becomes conductive upon said control gate being electrically positive relative to a particular one of said first and second terminals thereof and further wherein said timing circuit means comprises a resistance and capacitance network for accumulating electrical energy at a predetermined rate and a discharge triggering device for controlling the discharge of accumulated electrical energy, said timing circuit means being electrically connected with said one thyristor terminal for applying a negative going pulse thereto so that said control gate becomes electrically positive with respect thereto and conduction through said thyristor is initiated.

7. The combination according to claim 4 wherein said thyristor comprises first and second terminals and a control gate whereby said thyristor becomes conductive upon said control gate being electrically positive relative to a particular one of said first and second terminals thereof and further wherein said conduction maintaining circuit means comprises a resistance and capacitance network electrically connected between said control gate and said one thyristor terminal for accumulating electrical energy during conduction through said thyristor and for maintaining said control gate electrically positive through intermittent fluctuations of such conduction.

* * * * *